US00RE50459E

(19) United States
(12) Reissued Patent
Mencke et al.

(10) Patent Number: US RE50,459 E
(45) Date of Reissued Patent: Jun. 17, 2025

(54) ULTRA HIGH MOLECULAR WEIGHT POLYETHYLENE MULTIFILAMENT YARN

(71) Applicant: Avient Protective Materials B.V., Geleen (NL)

(72) Inventors: Jacobus Johannes Mencke, Echt (NL); Johannes Hendrikus Marie Heijnen, Echt (NL); Harm Van Der Werff, Echt (NL)

(73) Assignee: AVIENT PROTECTIVE MATERIALS B.V., Geleen (NL)

(21) Appl. No.: 18/087,665

(22) Filed: Dec. 22, 2022

Related U.S. Patent Documents

Reissue of:
(64) Patent No.: 11,230,797
Issued: Jan. 25, 2022
Appl. No.: 14/364,910
PCT Filed: Dec. 14, 2012
PCT No.: PCT/EP2012/075514
§ 371 (c)(1),
(2) Date: Jun. 12, 2014
PCT Pub. No.: WO2013/087827
PCT Pub. Date: Jun. 20, 2013

(30) Foreign Application Priority Data

Dec. 14, 2011 (EP) ..... 11193491

(51) Int. Cl.
*D01F 6/04* (2006.01)
*D01D 5/06* (2006.01)
(Continued)

(52) U.S. Cl.
CPC ..... *D01F 6/04* (2013.01); *D02G 3/02* (2013.01); *D01D 5/06* (2013.01); *D07B 1/025* (2013.01);
(Continued)

(58) Field of Classification Search
CPC ... D01F 6/04; D02G 3/02; D01D 5/06; D07B 1/025; D07B 2201/1096;
(Continued)

(56) References Cited

U.S. PATENT DOCUMENTS 6,448,359 B1 * 9/2002 Kavesh ..... D01F 6/04 526/352
6,746,975 B2 * 6/2004 Kavesh ..... D01D 4/02 442/135
(Continued)

FOREIGN PATENT DOCUMENTS

EP 0 213 208 3/1987
EP 1 643 018 4/2006
(Continued)

OTHER PUBLICATIONS

Submission Under 37 CFR 1.501 Regarding U.S. Pat. No. 11,230,797, Sheldon Kavesh, Ph.D., Feb. 10, 2022.
(Continued)

*Primary Examiner* — Joseph R Kosack
(74) *Attorney, Agent, or Firm* — NIXON & VANDERHYE P.C.

(57) ABSTRACT

The invention relates to a multifilament yarn containing n filaments, wherein the filaments are obtained by spinning an ultra-high molecular weight polyethylene (UHMWPE), said yarn having a tenacity (Ten) as expressed in cN/dtex of $Ten(cN/dtex)=f \times n^{-0.05} \times dpf^{-0.15}$, wherein Ten is at least 39 cN/dtex, n is at least 25, f is a factor of at least 58 and dpf is the dtex per filament.

16 Claims, 1 Drawing Sheet

NEW

(51) Int. Cl.
*D02G 3/02* (2006.01)
*D07B 1/02* (2006.01)

(52) U.S. Cl.
CPC ..... *D07B 2201/1096* (2013.01); *D07B 2201/2009* (2013.01); *D07B 2205/2014* (2013.01); *D07B 2501/2038* (2013.01); *D07B 2501/2061* (2013.01); *D10B 2321/0211* (2013.01); *Y10T 428/1369* (2015.01); *Y10T 428/24124* (2015.01); *Y10T 428/249921* (2015.04); *Y10T 428/298* (2015.01); *Y10T 428/31913* (2015.04); *Y10T 442/60* (2015.04)

(58) Field of Classification Search
CPC .... D07B 2201/2009; D07B 2205/2014; D07B 2501/2038; D07B 2501/2061; D10B 2321/0211; Y10T 428/1369; Y10T 428/24124; Y10T 428/298; Y10T 428/31913; Y10T 442/60
See application file for complete search history.

(56) References Cited

U.S. PATENT DOCUMENTS

| | | | | |
|---|---|---|---|---|
| 6,969,553 | B1 | 11/2005 | Tam et al. | |
| 7,674,409 | B1 * | 3/2010 | Tam | B29C 70/20 264/103 |
| 7,846,363 | B2 | 10/2010 | Tam et al. | |
| 2005/0093200 | A1 | 5/2005 | Tam et al. | |
| 2006/0051577 | A1 | 3/2006 | Tam et al. | |
| 2007/0154707 | A1 * | 7/2007 | Simmelink | A61L 17/04 428/364 |
| 2010/0233480 | A1 | 9/2010 | Hu et al. | |
| 2010/0268331 | A1 | 10/2010 | Simmelink et al. | |
| 2011/0039058 | A1 * | 2/2011 | Tam | B29C 43/22 428/105 |
| 2011/0266710 | A1 * | 11/2011 | Tam | D01D 5/12 264/210.7 |
| 2011/0268967 | A1 * | 11/2011 | Tam | D01F 6/04 428/364 |
| 2013/0225022 | A1 * | 8/2013 | Tam | D02G 3/02 442/60 |

FOREIGN PATENT DOCUMENTS

| | | |
|---|---|---|
| JP | 2008-512573 | 4/2008 |
| WO | WO 2005/066401 | 7/2005 |
| WO | WO 2009/056286 | 5/2009 |
| WO | WO 2009/060044 | 5/2009 |
| WO | 2011/137093 | 11/2011 |
| WO | WO 2012/139934 | 10/2012 |

OTHER PUBLICATIONS

E.C. Bernhardt, Ed., "*Processing of Thermoplastic Materials*", Reinhold Publishing Corp. New York, 1959, pp. 612-615.
W.F. Seyer et al., "*The Densities and Surface Tensions of cis and trans-Decahydronaphthalene Between −30 and 180°*", Journal of the American Chemical Society, 63(9), 2425-2427 (1941).
R.A.Orwell et al., "*Volume Changes of Mixing and Excess Coefficients of Thermal Expansion for Solutions of Polymethylene in n-Decane*", Macromolecules, 6(5), 755-757 (1973).
F.C. Frank et al., "*Polymer Chain Extension Produced by Impinging Jets and Its Effect on Polyethylene Solution*", Polymer, 12(7) 1971 (Abstract).
Mencke et al.; "*Applicant's Brief on Appeal*", U.S. Appl. No. 14/364,910, filed Jul. 22, 2019.
International Search Report for PCT/EP2012/075514 mailed Mar. 14, 2013.
International Search Report for PCT/EP2012/075514 dated Mar. 14, 2013.
Coleman, B.D., On The Strength of Classical Fibres and Fibre Bundles, Journal of the Mechanics and Physics of Solids, 1958, vol. 7, pp. 60-70.

* cited by examiner

NEW
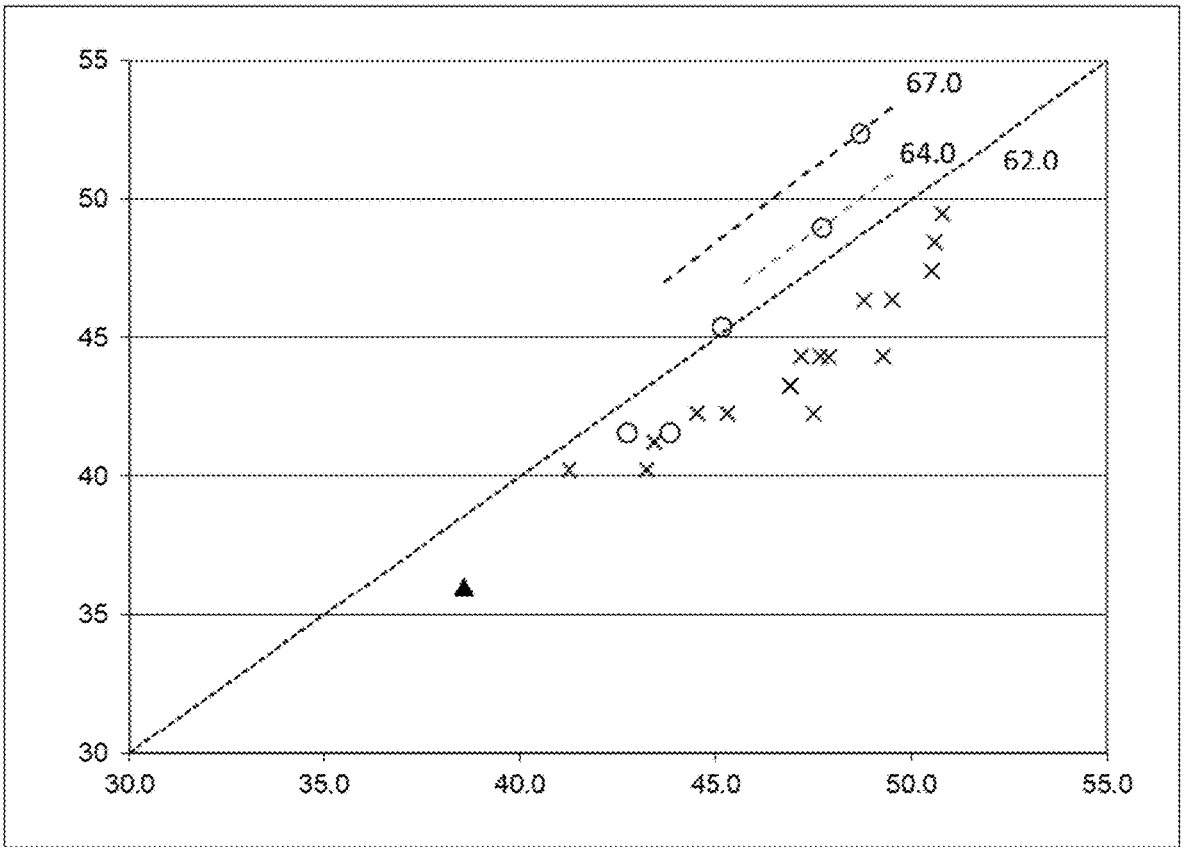

ULTRA HIGH MOLECULAR WEIGHT POLYETHYLENE MULTIFILAMENT YARN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is the *reissue of U.S. application Ser. No. 14/364,910 filed on Jun. 12, 2014* (*now U.S. Pat. No. 11,230,767*), *which in turn is the* U.S. national phase of International Application No. PCT/EP2012/075514 filed 14 Dec. 2012 which designated the U.S. and claims priority to EP 11193491.5 filed 14 Dec. 2011, the entire contents of each of which are hereby incorporated by reference.

The invention relates to a multifilament yarn containing n filaments, which are made from an ultra high molecular weight polyethylene (UHMWPE), wherein n is at least 25. The invention also relates to various products containing said yarn.

A multifilament yarn having a high performance in terms of tenacity, modulus, creep and other mechanical and physical properties is known for example from WO 2005066401. The yarn disclosed therein contains a plurality of filaments made from an UHMWPE polymer, the tenacity thereof being dependent on the number of the yarn's filaments. In particular the multifilament yarn of WO 2005066401 has surprisingly high tenacities or strengths, e.g. of more than 5.5 GPa (about 56.4 cN/dtex), for a relatively large number of filaments. These yarns are highly suitable for use in various semi-finished and end-use articles, examples thereof including ropes, cords, fishing nets, sports equipment, medical implants and ballistic-resistant composites.

A further multifilament yarn is disclosed in U.S. Pat. No. 6,969,553, the yarn having a strength of about 40 g/d (about 36 cN/dtex) and containing 120 filaments with a single filament titer of 4.34 denier (about 4.8 dtex).

It is however well known in literature that the tenacity of multifilament yarns decreases as the number of filaments in the yarn increases; and although known multifilament yarns, such as also the ones of WO 2005066401 or U.S. Pat. No. 6,969,553, show good properties, it was observed that yarns with large numbers of filaments may perform less optimal for some applications. It was therefore observed that there is room for further improving the tenacity of a large count multifilament yarn, i.e. a multifilament yarn having a large number of filaments, but also the tenacity of a large count multifilament yarn with filaments having a high dtex or linear density.

The present invention aims therefore to provide advantages and/or alternatives over the known multifilament yarns. It aims in particular to provide a multifilament yarn that has an optimized performance when used in various applications for various technological fields. It may also be an object of the invention to provide a multifilament yarn having a tenacity that decreases less than the tenacity of the known yarns when increasing the number of filaments.

The invention provides a multifilament yarn containing n filaments, wherein the filaments are obtained by spinning an ultra high molecular weight polyethylene, said yarn having a tenacity (Ten) as expressed in cN/dtex according to Formula 1:

$$\text{Ten(cN/dtex)}=f\times n^{-0.05}\times \text{dpf}^{-0.15} \qquad \text{Formula 1}$$

wherein Ten is at least 39 cN/dtex, n is at least 25, f is a factor of at least 58.0 and dpf is the dtex per filament.

It was observed that the multifilament yarn of the invention, hereinafter also referred to as "the inventive yarn", may have an optimized performance when utilized in various applications. In particular it was observed that large count inventive yarns may be provided having an optimum tenacity even when increasing the number of its filaments. More in particular it was observed that large count inventive yarns may be provided having optimum strength and filaments with a surprisingly high dpf.

It was observed that the above mentioned advantages may be achieved in particular for inventive yarns having a factor f of at least 60.0, preferably of at least 62.0, more preferably of at least 64.0, most preferably of at least 67.0.

It was further observed that high tenacities inventive yarns were obtained for yarns having a large number n of filaments, i.e. of at least 25, preferably of at least 50, more preferably of at least 100, even more preferably of at least 200, even more preferably of at least 400, most preferably of at least 700. Such yarns may also be manufactured with high productivity.

Moreover, it was observed that high tenacities inventive yarns were also obtained for yarns having a dpf of at least 0.8, preferably of at least 1, most preferably of at least 1.1. In a preferred embodiment, high tenacity yarns were obtained even at a dpf of at least 1.2 and even at least 1.3. This advantage was surprising as it is well known that by increasing the dpf of the individual filaments of a yarn, the yarn tenacity is decreasing. On the other hand having high dpf filaments containing yarns, various properties of the yarns, e.g. filaments breakages, yarn productivity and ballistic properties may also be optimized. Hence, it is desirable from the point of view of both yarn productivity and applicability to have yarns having high tenacities and containing large dpf filaments. For the first time to inventors' knowledge, the present invention provides such yarns.

According to the invention, the filaments making the inventive yarn are obtained by spinning a polymer of ultra high molecular weight polyethylene, hereinbefore and after shortly UHMWPE. Preferably, said filaments are obtained by gel-spinning the UHMWPE with a process containing the steps of:

a) providing a solution of UHMWPE in a suitable solvent
b) spinning a multifilament yarn by passing the solution of step a) through a spinning plate containing a plurality of spin-holes to form the filaments of said yarn; and
c) drawing the filaments in at least one drawing step before, during or after removing the solvent.

It was noticed that the inventive yarns were obtained when the UHMWPE solution contained a carefully controlled amount of UHMWPE polymer. Surprisingly, to manufacture the inventive yarns, the UHMWPE solution needs to contain between 3 wt % and 12 wt % UHMWPE polymer, preferably between 4 wt % and 10 wt % UHMWPE polymer, more preferably between 5 wt % and 9 wt % UHMWPE polymer, most preferably between 6 wt % and 8 wt % UHMWPE polymer.

A further parameter is the elongational stress (ES) of the UHMWPE polymer. Only after a skillful undertaking the present inventors determined that the UHMWPE polymer preferably has an ES of at least 0.4 $N/mm^2$, more preferably at least 0.45 $N/mm^2$, even more preferably at least 0.5 $N/mm^2$, most preferably at least 0.55 $N/mm^2$. Preferably said ES is at most 0.90 $N/mm^2$, more preferably at most 0.85 $N/mm^2$, even more preferably at most 0.80 $N/mm^2$, most preferably at most 0.75 $N/mm^2$. It is important to note that the ES of the UHMWPE may change during its processing into a fiber, e.g. due to chain scission. Hence the ES of the UHMWPE in the fiber will usually be lower than the ES of the UHMWPE in solution. Such UHMWPEs are commercially available and they can be purchased from DSM N.V. or Ticona. Also the person skilled in the art may manufacture UHMWPEs with various ES by following the methodology disclosed in WO 2009060044 and WO 2012139934 (pg. 18).

Preferably, the UHMWPE is a homopolymer, i.e. a linear polyethylene with less than one branch per 100 carbon atoms, and preferably less than one branch per 300 carbon atoms. In an embodiment, the UHMWPE is a linear polyethylene further containing up to 5 mol % of one or more comonomers, such as alkenes like propylene, 1-butene, 1-pentene, 4-methyl-1-pentene or 1-octene. The UHMWPE may also contain small amounts, generally less than 5 mass %, preferably less than 3 mass % of customary additives, e.g. anti-oxidants, thermal stabilizers, colorants, flow promoters, etc.

Suitable examples of solvents include aliphatic and alicyclic hydrocarbons, e.g. octane, nonane, decane and paraffins, including isomers thereof; petroleum fractions; mineral oil; kerosene; aromatic hydrocarbons, e.g. toluene, xylene, and naphthalene, including hydrogenated derivatives thereof, e.g. decalin and tetralin; halogenated hydrocarbons, e.g. monochlorobenzene; and cycloalkanes or cycloalkenes, e.g. careen, fluorine, camphene, menthane, dipentene, naphthalene, acenaphtalene, methylcyclopentandien, tricyclodecane, 1,2,4,5-tetramethyl-1,4-cyclohexadiene, fluorenone, naphtindane, tetramethyl-p-benzodiquinone, ethylfuorene, fluoranthene and naphthenone. Also combinations of the above-enumerated spinning solvents may be used for gel spinning of UHMWPE, the combination of solvents being also referred to for simplicity as spinning solvent. In a preferred embodiment, the spinning solvent of choice is not volatile at room temperature, e.g. paraffin oil. It was also found that the process of the invention is especially advantageous for relatively volatile solvents at room temperature, as for example decalin, tetralin and kerosene grades. In the most preferred embodiment the solvent of choice is decalin.

According to the invention, the UHMWPE solution is formed into individual filaments by spinning said solution through a spinning plate containing a plurality of spin-holes.

Preferably, the spinning plate contains at least 25 spin-holes. In a preferred embodiment, the inventive yarn is an as-spun yarn, i.e. an inventive yarn is obtained at the end of the gel-spinning process. Therefore, since for an as-spun inventive yarn the number of spin-holes contained by said spinning plate determines the number of filaments in the yarn, it goes without saying that the preferred numbers of spin-holes are as defined by the numbers of filaments contained by the inventive yarn.

In a preferred embodiment, each spin-hole of the spinning plate has a geometry comprising at least one contraction zone. By contraction zone is herein understood a zone with a gradual decrease in diameter with a cone angle of preferably below 60°, more preferably below 50°, even more preferably below 40°, from an initial diameter $D_0$ to a final diameter $D_n$ such that a draw ratio $DR_{sp}$ is achieved in the spin-hole. Preferably, the spin-hole further comprises upstream and/or downstream of the contraction zone, a zone of constant diameter. If a downstream zone with constant diameter is present, such a zone preferably has a length/diameter ratio $L_n/D_n$ of between 1 and 50.

Preferably, the multifilament yarn is issued from the spin-holes into an air gap and then into a quench zone, said air gap having a length of preferably between 1 mm and 20 mm, more preferably between 2 mm and 15 mm, even more preferably between 2 mm and 10 mm, most preferably between 2 mm and 5 mm. Although called air gap, said gap can be filled with any gas or gaseous mixture, e.g. air, nitrogen or other inert gases. By air gap is herein understood the distance between the spinning plate and the quench zone. The quench zone can be a liquid, e.g. water, containing bath at a temperature below the spinning temperature, e.g. about room temperature. Preferably, the multifilament yarn is drawn in the air gap with a draw ratio $DR_{ag}$, typically referred to in the art as draw down, of between 2 and 20, more preferably between 3 and 10, most preferably between 4 and 8.

Preferably, the spinning step b) is carried out at a spinning temperature below the boiling point of the solvent, more preferably between 150° C. and 250° C. If for example decaline is used as solvent the spinning temperature is preferably at most 210° C., more preferably at most 190° C., even more preferably at most 180° C., most preferably at most 170° C. and preferably at least 115° C., more preferably at least 120° C., most preferably at least 125° C. In case of paraffin as solvent, the spinning temperature is preferably below 220° C., more preferably between 130° C. and 200° C., most preferably between 130° C. and 195° C.

It is essential in order to obtain the inventive yarns that a reduced throughput of the UHMWPE solution per spin-hole of the spinning plate is utilized. Determining the correct throughput in order to manufacture the multifilament yarns of the present invention necessitated a lengthy and intensive inventive work; one reason being that high throughputs per spin-hole seemed not to deliver the desired results and another reason being that by reducing said throughput, the productivity of the entire process may decrease to unacceptably commercial levels. Preferably, said throughput is between 1.0 and 3.0 g solution/min/hole, more preferably between 1.2 and 2.6 g solution/min/hole, most preferably between 1.4 g solution/min/hole and 2.4 g solution/min/hole. Said throughput can easily be adjusted by using a spinning pump or a gear pump. In a preferred embodiment, an UHMWPE solution is spun with a throughput of between 1.0 and 3.0 g solution/min/hole, said UHMWPE having an ES of at least 0.60 $N/mm^2$, more preferably an ES of at least 0.65 $N/mm^2$. For the above said throughputs and for the above said ES of the UHMWPE, preferably a spin-hole having a final diameter $D_n$ of between 0.5 mm and 2 mm is used, most preferably between 0.8 mm and 1.2 mm.

The process according to the invention further comprises drawing the filaments before, during and/or after said removal of the solvent. Preferably, the drawing of the filaments after removal of the solvent is performed in at least one drawing step, with a draw ratio of at least 3, more preferably at least 4, most preferably at least 5. More preferably, the drawing of filaments is performed in at least two steps, or even in at least three steps. Preferably, each drawing step is carried out at a different temperature that is preferably chosen to achieve the desired drawing ratio without the occurrence of filament breakage. Preferably, drawing is performed in more than two steps, and if UHMWPE is used preferably the drawing is carried out at different temperatures with an increasing profile between about 120 and 155° C. If the drawing of solid filaments is performed in more than one step, $DR_{solid}$ is calculated by multiplying the draw ratios achieved for each solid individual drawing step. Preferably the total draw ratio applied on the filaments during and/or after removing the solvent, herein after referred to $DR_{total}$, is at least 10, more preferably at least 20, even more preferably at least 30, yet even more preferably at least 40, most preferably at least 50.

Preferably, the overall draw ratio, i.e. the total draw ratio to which the filaments are subjected during their entire manufacturing process is at least 20, more preferably at least 25, even more preferably at least 30, most preferably at least 40. It was observed that by increasing the overall draw ratio, the mechanical properties of the inventive yarns were improved. In particular the tensile strength and modulus increased.

The solvent removal process may be performed by known methods, for example by evaporation when a relatively volatile solvent, e.g. decaline, is used to prepare the UHMWPE solution or by using an extraction liquid, e.g. when paraffin is used, or by a combination of both methods. Suitable extraction liquids are liquids that do not cause significant changes to the UHMWPE network structure of the filaments, for example ethanol, ether, acetone, cyclohexanone, 2-methylpentanone, n-hexane, dichloromethane, trichlorotrifluoroethane, diethyl ether and dioxane or mixtures thereof. Preferably, the extraction liquid is chosen such that the solvent can be separated from the extraction liquid for recycling.

The yarns of the invention, hereinafter the inventive yarns, have properties which make them an interesting material for use in ropes, cordages and the like, preferably ropes designed for heavy-duty operations as for example marine, industrial and offshore operations. In particular it was observed that the inventive yarns are particularly useful for long-term and ultralong-term heavy-duty operations.

Heavy duty operations may further include, but not restricted to, anchor handling, mooring of support platforms for offshore renewable energy generation, mooring of offshore oil drilling rigs and production platforms and the like.

The inventive yarns are also very suitable for use as a reinforcing element for reinforced products such as hoses, pipes, electrical and optical cables, especially when said reinforced products are used in deepwater environments where reinforcement is required to support the load of the reinforced products when free hanging. The invention therefore also relates to a reinforced product containing reinforcing elements wherein the reinforcing elements contain the inventive yarns.

The invention also relates to medical devices comprising the inventive yarns. In a preferred embodiment, the medical device is a cable or a suture. Other examples include mesh, endless loop products, bag-like or balloon-like products, but also other woven and/or knitted products. Good examples of cables include a trauma fixation cable, a sternum closure cable, and a prophylactic or per prosthetic cable, long bone fracture fixation cable, small bone fracture fixation cable. Also tube-like products for e.g. ligament replacement are suitably manufactured from the inventive yarns.

The invention also relates to ropes and in particular mooring ropes, with or without a cover, containing the inventive yarns. Preferably the ropes of the invention are braided ropes. It was observed that the ropes of the invention had good bending properties. Preferably, at least 50 mass-%, more preferably at least 75 mass-%, even more preferably at least 90 mass-% from the total mass of the yarns used to manufacture the rope and/or the cover consists of the inventive yarns. Most preferably the mass of yarns used to manufacture the rope and/or the cover consists of the inventive yarns. The remaining mass percentage of the yarns in the rope according to the invention, may contain yarns or combination of yarns made of other materials suitable for making yarns as for example metal, glass, carbon, nylon, polyester, aramid, other types of polyolefin and the like.

The invention further relates to composite articles containing the inventive yarns. Preferably, the composite articles comprise networks of the inventive yarns. By network is meant that the filaments of said yarns are arranged in configurations of various types, e.g. a knitted or woven fabric, a non-woven fabric with a random or ordered orientation of the yarns, a parallel array arrangement also known as unidirectional UD arrangement, layered or formed into a fabric by any of a variety of conventional techniques. Preferably, said articles comprise at least one network of said yarns. More preferably, said articles comprise a plurality of networks of the inventive yarns, Such networks of the inventive yarns can be comprised in cut resistant garments, e.g. gloves and also in anti-ballistic products, e.g. bulletproof panels, vests and helmets. Therefore, the invention also relates to such articles.

In a preferred embodiment, the composite article contains at least one mono-layer comprising the inventive yarns. The term mono-layer refers to a layer of yarns, i.e. yarns in one plane. In a further preferred embodiment, the mono-layer is a unidirectional mono-layer. The term unidirectional mono-layer refers to a layer of unidirectionally oriented yarns, i.e. yarns in one plane that are essentially oriented in parallel. In a yet further preferred embodiment, the composite article is multi-layered composite article, containing a plurality of unidirectional mono-layers the direction of the yarns in each mono-layer preferably being rotated with a certain angle with respect to the direction of the yarns in an adjacent mono-layer. Preferably, the angle is at least 30°, more preferably at least 45°, even more preferably at least 75°, most preferably the angle is about 90°. Multi layered composite articles proved very useful in ballistic applications, e.g. body armor, helmets, hard and flexible shield panels, panels for vehicle armouring and the like. Therefore, the invention also relates to ballistic-resistant articles as the ones enumerated hereinabove containing the inventive yarns.

It was also observed that the inventive yarns are also suitable for use in other applications like for example, fishing lines and fishing nets, ground nets, cargo nets and curtains, kite lines, dental floss, tennis racquet strings, canvas (e.g. tent canvas), nonwoven cloths and other types of fabrics, webbings, battery separators, capacitors, pressure vessels, hoses, (offshore) umbilical cables, electrical, optical fiber, and signal cables, automotive equipment, power transmission belts, building construction materials, cut and stab resistant and incision resistant articles, protective gloves, composite sports equipment such as skis, helmets, kayaks, canoes, bicycles and boat hulls and spars, speaker cones, high performance electrical insulation, radomes, sails, geotextiles and the like. Therefore, the invention also relates to the applications enumerated above containing the yarns of the invention.

The invention also relates to a roundsling comprising the inventive yarn.

The invention also relates to sports equipments comprising the inventive yarn, including a fishing line, a kite line and a yacht line. The invention also relates to a freight container having walls comprising the inventive yarn.

The invention will be further explained by the following examples and comparative experiment, however first the methods used in determining the various parameters used hereinabove are presented.

METHODS OF MEASURING

Fibers' titer: (dtex) was measured by weighing 100 meters of fiber. The dtex of the fiber was calculated by dividing the weight in milligrams by 10;

Tensile properties of fibers: tensile strength (or strength), tensile modulus (or modulus) and elongation at break (EAB) are defined and determined on multifilament yarns as specified in ASTM D885M, using a nominal gauge length of the fibre of 500 mm, a crosshead speed of 50 mm/min and Instron 2714 clamps, of type "Fibre Grip D5618C". On the basis of the measured stress-strain curve the modulus is determined as the gradient between 0.3 and 1% strain. For calculation of the modulus and strength, the tensile forces measured are divided by the titre; values in GPa are calculated assuming a density of 0.97 g/cm$^3$.

Tensile properties of fibers having a tape-like shape: tensile strength, tensile modulus and elongation at break are defined and determined at 25° C. on tapes of a width of 2 mm as specified in ASTM D882, using a nominal gauge length of the tape of 440 mm, a cross-head speed of 50 mm/min.

Number of branches, in particular ethyl branches, per thousand carbon atoms: was determined by FTIR on a 2 mm thick compression moulded film by quantifying the absorption at 1375 cm$^{-1}$ using a calibration curve based on NMR measurements as in e.g. EP 0 269 151 (in particular pg. 4 thereof), Elongational stress (ES) of an UHMWPE is measured according to ISO 11542-2A.

Back face deformation (BFD) of a sample may be tested according to NIJ 0101.04 level IIIA using for example a 1.1 mm FSP and 20 mm FSP on an internal shooting template. In particular for this invention, flexible panels were subjected to such BFD testing by placing them onto a backing of Roma Plastilina No. 1. Prior to testing, the consistency of the backing material was validated according to NIJ Standard-1001.06 (falling ball test). The backing material was preconditioned at 35° C. BFD was quantified by measuring the indentation depth in the backing material resulting from impact of an 0.44 Magnum Semi Jacketed Hollow Point (SJHP) bullet impacting at 400 ms on a flexible panel of a total areal density of 5.2 kg/m$^2$. The BFD is determined as the average indentation depth of 4 shots on the same flexible panel.

Ballistic performance of a sample was measured by subjecting the sample to shooting tests performed with various projectiles such as AK47 MSC bullet (hereinafter AK47), 0.357 Magnum 10.2 g bullet (hereinafter Magnum), 9 mm full metal jacket 8.0 g bullet (hereinafter 9 mm) and standard (STANAG) 20 g FSP (hereinafter FSP20) and 1.1 g FSP (hereinafter FSP1.1). The first shot was fired at a projectile speed ($V_{50}$) at which it is anticipated that 50% of the shots would be stopped. The actual bullet speed was measured at a short distance before impact. If a stop was obtained, the next shot was fired at an anticipated speed being 10% higher than the previous speed. If a perforation occurred, the next shot was fired at a speed 10% lower than the previous speed. The result for the experimentally obtained $V_{50}$ value was the average of the two highest stops and the two lowest perforations. The kinetic energy of the bullet at $V_{50}$ was divided by the total areal density of the sample to obtain a so-called $E_{abs}$ value. $E_{abs}$ reflects the stopping power of the sample relative to its weight/thickness thereof. The higher the $E_{abs}$ the better the ballistic properties of the sample are,

EXAMPLES 1 and 2

A 6 wt % slurry of a UHMWPE homopolymer powder having an elongational stress (ES) of about 0.68 N/mm$^2$ was prepared in decalin and fed to a 42 mm co-rotating twin screw extruder heated at a temperature of 180° C., the extruder also being equipped with a gear-pump. In the extruder the slurry was transformed into a solution and the solution was issued through a spin plate having 50 spin holes with a rate of about 2.1 g/min per hole.

The spin holes had an initial cylindrical channel of 2 mm diameter ($D_0$) followed by a conical contraction with a cone angle of 15° into a cylindrical channel of 0.8 mm diameter ($D_n$) and $L_n/D_n$ of 10. The fluid filaments issued from the cylindrical channel entered an air gap having a length of 15 mm, and were taken-up at such rate that a draw down of about 4 was applied in the air gap. Subsequently they were cooled to room temperature in a water bath to form gel filaments, i.e. cooled filaments that contain a large amount of solvent.

The filaments subsequently entered an oven. In the oven the filaments were further stretched 10 times at about 147° C. and the decalin evaporated. The yarn was drawn in a second step with various draw ratios as shown in Table 1 below.

The yarn had the following properties:

TABLE 1

| | Example 1 | Example 2 | |
|---|---|---|---|
| draw ratio | 3.5 | 3.9 | |
| Dtex yarn | 78 | 68 | |
| Tenacity yarn | 49 | 52.4 | cN/dtex |
| Modulus yarn | 1798.7 | 1981.6 | cN/dtex |
| EAB yarn | 3.4 | 3.2 | |
| dpf | 1.56 | 1.36 | dtex |

EXAMPLE 3

A 7 wt % slurry in decalin of a UHMWPE homopolymer powder having an ES of 0.68 N/mm$^2$ was prepared and fed to a 133 mm co-rotating twin screw extruder heated at a temperature of 180° C., the extruder also being equipped with a gear-pump. In the extruder the slurry was transformed into a solution and the solution was issued through a spin plate having 780 spin holes with a rate of 2.4 g/min per hole.

The spin holes had an initial cylindrical channel of 2 mm diameter ($D_0$) followed by a conical contraction with a cone angle of 15° into a cylindrical channel of 0.8 mm diameter ($D_n$) and $L_nD_n$ of 10. The fluid filaments issued from the cylindrical channel entered an air gap of length 15 mm. The fluid filaments were taken-up at such rate that a draw down of 5 was applied to the fluid filaments in the air-gap and then cooled to room temperature in a water bath.

The filaments subsequently entered an oven. In the oven the filaments were further stretched 9 times at about 147° C. and the decalin evaporated. The yarn was drawn in a second step at a temperature of 152° C. with a draw ratio of 4.7.

The yarn had the following properties:

TABLE 2

| | | |
|---|---|---|
| draw ratio | 4.7 | |
| Dtex yarn | 1024.0 | |
| Tenacity yarn | 41.6 | cN/dtex |
| Modulus yarn | 1613 | cN/dtex |
| EAB yarn | 3.14 | |
| dpf | 1.3 | dtex |

EXAMPLES 4 and 5

A 7 wt % slurry in decalin of a UHMWPE homopolymer powder having an ES of 0.61 N/mm$^2$ was prepared and fed to a 133 mm co-rotating twin screw extruder heated at a temperature of 180° C., the extruder also being equipped with a gear-pump. In the extruder the slurry was transformed into a solution and the solution was issued through a spin plate having 780 spin holes with a rate of 1.4 g/min per hole.

The spin holes had an initial cylindrical channel of 2 mm diameter ($D_o$) followed by a conical contraction with a cone angle of 15° into a cylindrical channel of 0.8 mm diameter ($D_n$) and $L_n/D_n$ of 10. The fluid filaments issued from the cylindrical channel entered an air gap of 15 mm. The fluid filaments were taken-up at such rate that a draw down of 6.2 was applied to the fluid filaments in the air-gap and then cooled in a water bath.

The filaments subsequently entered an oven. In the oven the filaments were further stretched 10 times at about 147° C. and the decalin evaporated. The yarn was drawn in a second step at a temperature of 153° C. at various draw ratios.

The yarn had the following properties:

TABLE 3

| | Example 4 | Example 5 | |
|---|---|---|---|
| draw ratio | 4 | 5 | |
| Dtex yarn | 869 | 687 | dtex |
| Tenacity yarn | 41.6 | 45.4 | cN/dtex |
| Modulus yarn | 1568 | 1772 | cN/dtex |
| EAB yarn | 3.14 | 3.07 | |
| dpf | 1.1 | 0.9 | dtex |

[To] *The* invention is further explained with the help of FIGURE. Therein it is represented the tenacity of the yarns versus [$f\times n^{0.05}\times dpf^{-0.15}$] $f\times n^{-0.05}\times dpf^{-0.15}$. The *data in the* FIGURE clearly show that the yarns of the invention (represented by o) as manufactured according to Examples 1[-], *2 and* 5 have a higher tensile strength than the known commercial yarns or the best yarns reported in WO [2005066401] *2005/066401* (all represented by [•] *x*) and in U.S. Pat. No. 6,969,553 B1 (represented by ▲) at a given filament count and dpf. Therefore, the inventors were able to [manufactured] *manufacture* for the first time yarns having a large number of high dtex filaments while surprisingly also increasing the tenacity of the yarns. In *the* FIGURE, the dotted lines [represents] *represent* Formula 1 "Ten(cN/dtex)=$f\times n^{-0.05}\times dpf^{-0.15}$" wherein f was [58.6, 62.5,] *62.0,* 64.0 and 67.0, respectively.

EXAMPLE 6

A unidirectional monolayer was formed from a plurality of the yarns aligned to run in parallel. The yarns had a dtex of about 1220.0; a tenacity of about 39.7 cN/dtex; a modulus of about 1450 cN/dtex and a dtex per filament of about 1.5. The yarns were held together by about 17 mass % (of the total mass of the monolayer) of an elastomeric matrix material based on Kraton® rubber. A sheet was formed using 4 stacked unidirectional monolayers in a 0-90° orientation. The areal density of resulting sheet was 212 gr/m$^2$.

The yarns were made according to Example 3, with the difference that the solution was issued at a rate of 1.7 g/min/hole; a draw down of about 6.5 was used; the yarn was drawn 8 times at about 147° C. in the first step and 3.8 times in a second step at a temperature of about 152.5° C.

A number of such sheets were pressed together to form a rigid panel with an areal density of 15.5 kg/m$^2$. The V50 of the panel for an AK47 FMJ MSC bullet was determined to be about 891 ms, corresponding to an $E_{abs}$ of about 242 J.m$^2$/kg. The data is included in Table 4.

Comparative Experiment 1 (CE1)

Example 6 was repeated with the difference that commercial UHMWPE yarns sold by DSM Dyneema® B.V., the Netherlands, and known as SK76 (1500 dtex; tenacity 36.5 cN/dtex; modulus 134 N/tex) were used instead of the yarns of Example 3. A monolayer contained about 16 mass % of matrix. The areal density of the sheet was about 233 gr/m$^2$ and the areal density of the pressed panel was about 16.0 Kg/m$^2$. The V50 of the panel for an AK47 FMJ MSC bullet was determined to be about 814 ms, corresponding to an $E_{abs}$ of about 166 J.m$^2$/kg. The data is included in Table 4.

EXAMPLE 7

A number of sheets as in Example 6 were made, with the difference that each sheet also contained two 7 micrometers thick LDPE films sandwiching the stack of 4 monolayers. The areal density of such a sheet was about 157 gr/m$^2$. Three flexible panels, two having an areal density of about 3.1 Kg/m$^2$ and one having an areal density of about 4.9 Kg/m$^2$, were formed by assembling a number of flexible sheets. The sheets were not pressed. The panels having 3.1 Kg/m$^2$ were shot with a 0.357 Magnum JSP bullet and with a 9 mm FMJ Parabellum bullet. The panel having 4.9 Kg/m$^2$ was shot with a 17 grain FSP. The data is included in Table 4.

Comparative Experiment 1 (CE2)

Example 7 was repeated with the difference that commercial UHMWPE yarns sold by Dyneema® B.V., the Netherlands, and known as SK76 were used instead of the yarns of Example 3 and a sheet only contained two monolayers. The areal density of such a sheet was about 132 gr/m$^2$. The data is reported in Table 4.

TABLE 4

| Example | $AD_{sheet}$ gr/m$^2$ | $AD_{panel}$ Kg/m$^2$ | matrix % | BFD mm | threat | V50 m/s | Eabs J/[kg/m$^2$] |
|---|---|---|---|---|---|---|---|
| 6 | 212 | 15.5 | 16.7 | — | AK47 | 891.3 | 242 |
| CE1 | 233 | 16.0 | 16 | — | AK47 | 814 | 166 |
| 7 | 157 | 3.1 | 17 | 34 | Magnum | 522.8 | 453 |
| | | 3.1 | | | 9 mm | 534.4 | 373 |
| | | 4.9 | | | FSP1.1 | 611.6 | 41 |
| CE2 | 132 | 3.0 | 17 | 40 | Magnum | 457 | 358 |
| | | 3.0 | | | 9 mm | 400 | 218 |
| | | 4.9 | | | FSP1.1 | 535 | 33 |

It can be easily observed from Table 4 that the panels based on the yarns of the invention show a noticeable improvement of their ballistic properties. Therefore, the invention relates to a panel comprising a plurality of sheets containing the yarn of the invention. Preferably, each sheet comprises a plurality of monolayers, preferably at least 2 monolayers, more preferably at least 4 monolayers. Preferably each sheet comprises at most 8 monolayers, more preferably at most 6 monolayers. Preferably the yarns in the sheets or in the monolayers are arranged unidirectionally, i.e. they run along a common direction. Preferably the sheets or the monolayers also contains a matrix material typically used to stabilize the handling thereof in an amount of at most 25 mass % based on the total weight of the panel, more preferably at most 21 mass %, even preferably at most 19 mass %, most preferably at most 17 mass %. Preferably, the amount of said matrix material is at least 5 mass %, more preferably at least 10 mass %, most preferably at least 15 mass %. In a preferred embodiment, the panel comprises a number of sheets, each sheet comprising a stack of monolayers and further comprising two polymeric films, preferably polyethylene films, more preferably LDPE films, sandwiching said stack of monolayers.

In a preferred embodiment, the panel of the invention is a rigid panel having preferably an Eabs (J/[kg/m$^2$]) of at least 170 against an AK47 FMJ MSC projectile, more preferably of at least 190, even more preferably at least 210, most preferably at least 230, said Eabs being determined for an areal density of the panel of about 15.5 kg/m$^2$. Preferably, the article of the invention is a rigid article. By a rigid panel is herein understood an article having a flexural strength of preferably at least 10 MPa, more preferably of at least 20 MPa, most preferably of at least 40 MPa as measured before impacts. The flexural strength can be measured using a methodology as described at pg. 14 of WO 2012032082. A rigid panel can be obtained by subjecting a stack of sheets comprising fibers, preferably unidirectionally aligned yarns containing fibers, to a pressure of at least 50 bars, more preferably at least 70 bars, most preferably at least 90 bars; and to a temperature preferably below the melting temperature of said fibers, more preferably within the range of 20 degrees below said melting temperature. The melting temperature of the fibers can be determined by DSC using a methodology as described at pg. 13 of WO 2009056286.

In another preferred embodiment, the panel of the invention is a flexible panel having preferably an Eabs (J/[kg/m$^2$]) of at least 370 against a 0.357 Magnum JSP projectile, more preferably of at least 390, even more preferably at least 410, yet even preferably at least 430, most preferably at least 450; said Eabs being determined for a flexible panel having an areal density of about 3.1 Kg/m$^2$. By flexible panel is herein understood a panel manufactured by assembling together a plurality of sheets without compressing. Stitching or (spot)-gluing the sheets together may be utilized to provide the panel with better handleability. Alternatively, the sheets may be hold together by a bag. Preferably, the flexible panel has an Eabs (J[kg/m$^2$]) against an 9 mm FMJ Parabellum projectile of at least 220, more preferably at least 250, even more preferably at least 280, yet even more preferably at least 310, yet even more preferably at least 340, most preferably at least 370; said Eabs being determined for a flexible panel having an areal density of about 3.1 Kg/m$^2$. Preferably, the flexible panel has an Eabs (J[kg/m$^2$]) against a 17 grain FSP projectile of at least 35, more preferably at least 38, most preferably at least 41; said Eabs being determined for a flexible panel having an areal density of about 3.1 Kg/m$^2$.

EXAMPLE 8

A rope was braided from the yarns of the invention. It was observed that when subjected to bending, the bending performance of such a rope was improved with 38% in comparison with a similar rope braided from known yarns of Dyneema® SK75 fibers. The bending performance of the rope braided from the yarns of the invention was also improved with about 10% over a rope braided from yarns as reported in WO 2005066401.

The invention claimed is:

1. A multifilament yarn comprising a number n of filaments, wherein the filaments are obtained by spinning an ultra-high molecular weight polyethylene (UHMWPE), said yarn having a tenacity (Ten) as expressed in cN/dtex according to Formula 1:

$$\text{Ten(cN/dtex)}=f\times n^{-0.05}\times \text{dpf}^{-0.15} \quad \text{(Formula 1)}$$

wherein Ten is at least 39 cN/dtex, n is at least 100, f is a factor of at least [58] *62.0* and dpf is the dtex per filament.

[2. The yarn according to claim 1 wherein the factor f is at least 60.0.]

3. The yarn according to claim 1 wherein the number n of filaments is at least 200.

4. The yarn according to claim 1 wherein the dpf is at least 0.8.

5. The yarn according to claim 1, wherein the number n of filaments is at least 400.

6. The yarn according to claim 1, wherein the dpf is at least 1.3.

7. Ropes and cordages comprising the multifilament *yarn* according to claim 1.

8. A reinforcing element suitable for reinforcing products, the element comprising the multifilament *yarn* according to claim 1.

9. A medical device comprising the multifilament *yarn* according to claim 1.

10. A composite article comprising the multifilament *yarn* according to claim 1.

11. A composite article comprising at least one monolayer which comprises the multifilament yarn according to claim 1.

12. A multi-layered composite article containing a plurality of unidirectional mono-layers, said mono-layers comprising the multifilament *yarn* according to claim 1, wherein the direction of the *multifilament* yarn in each mono-layer is rotated [with] *at* an angle with respect to the direction of the *multifilament* yarn in an adjacent mono-layer.

13. A product comprising the multifilament *yarn* according to claim 1, wherein the product is selected from the group consisting of fishing lines and fishing nets, ground nets, cargo nets and curtains, kite lines, dental floss, tennis racquet strings, canvas, tent canvas, nonwoven cloths, webbings, battery separators, capacitors, pressure vessels, hoses, umbilical cables, electrical, optical fiber, and signal cables, automotive equipment, power transmission belts, building construction materials, cut and stab resistant and incision resistant articles, protective gloves, composite sports equipment, skis, helmets, kayaks, canoes, bicycles and boat hulls and spars, speaker cones, high performance electrical insulation, radomes, sails and geotextiles.

14. A panel comprising a plurality of sheets containing the multifilament yarn of claim 1, wherein each sheet comprises at least two monolayers.

15. The panel of claim 14, wherein the panel has an Eabs (J/[kg/m$^2$]) of at least 170 against an AK47 FMJ MSC projectile, said Eabs being determined for an areal density of the panel of about 15.5 kg/m$^2$.

16. The panel of claim 14, wherein the panel has an Eabs (J/[kg/m$^2$]) of at least 370 against a 0.357 Magnum JSP projectile, said Eabs being determined for an areal density of the panel of about 3.1 Kg/m$^2$.

17. The panel of claim 16, wherein the panel has an Eabs (J/[kg/m$^2$]) against a 17 grain FSP projectile of at least 35, said Eabs being determined for an areal density of the panel of about 3.1 Kg/m$^2$.

* * * * *